US008965204B2

(12) United States Patent
Camino, Jr. et al.

(10) Patent No.: US 8,965,204 B2
(45) Date of Patent: Feb. 24, 2015

(54) MULTI-DROP OPTICAL COMMUNICATION

(75) Inventors: Nestor J. Camino, Jr., Hingham, MA (US); Harris D. Kagan, Foxborough, MA (US)

(73) Assignee: Invensys Systems, Inc., Foxboro, MA (US)

( * ) Notice: Subject to any disclaimer, the term of this patent is extended or adjusted under 35 U.S.C. 154(b) by 204 days.

(21) Appl. No.: 13/468,822

(22) Filed: May 10, 2012

(65) Prior Publication Data

US 2012/0288281 A1 Nov. 15, 2012

Related U.S. Application Data

(60) Provisional application No. 61/484,560, filed on May 10, 2011.

(51) Int. Cl.
*H04B 10/00* (2013.01)
*G02B 6/42* (2006.01)
*H04B 10/278* (2013.01)

(52) U.S. Cl.
CPC .............. *G02B 6/4291* (2013.01); *G02B 6/429* (2013.01); *H04B 10/278* (2013.01); *G02B 6/421* (2013.01); *G02B 6/4215* (2013.01); *G02B 6/4246* (2013.01)
USPC .............................. 398/58; 398/135; 398/139

(58) Field of Classification Search
USPC ........................ 398/106–113, 58, 59, 135, 139
See application file for complete search history.

(56) References Cited

U.S. PATENT DOCUMENTS

| | | | |
|---|---|---|---|
| 4,551,829 A | 11/1985 | Dragoo et al. | |
| 4,628,493 A * | 12/1986 | Nelson et al. | 367/79 |
| 4,673,270 A | 6/1987 | Gordon | |
| 4,743,752 A * | 5/1988 | Olsen et al. | 250/206.1 |
| 4,777,661 A * | 10/1988 | Spillman, Jr. | 398/168 |
| 4,785,288 A | 11/1988 | Heberlein, Jr. et al. | |
| 4,820,916 A * | 4/1989 | Patriquin | 250/208.2 |
| 4,822,125 A | 4/1989 | Beals et al. | |
| 4,845,357 A * | 7/1989 | Brennan | 250/227.14 |
| 4,955,238 A * | 9/1990 | Jones et al. | 73/800 |
| 4,993,796 A | 2/1991 | Kapany et al. | |
| 5,051,965 A * | 9/1991 | Poorman | 367/149 |
| 5,054,873 A | 10/1991 | Davis et al. | |
| 5,153,764 A | 10/1992 | Faulkner et al. | |
| 5,195,162 A * | 3/1993 | Sultan et al. | 385/130 |
| 5,223,707 A * | 6/1993 | Bjork | 250/227.21 |
| 5,278,687 A | 1/1994 | Jannson et al. | |
| 5,552,921 A | 9/1996 | Hetzel et al. | |
| 5,569,911 A * | 10/1996 | Tomlinson et al. | 250/227.24 |

(Continued)

OTHER PUBLICATIONS

International Search Report for PCT Application No. PCT/US12/37331 dated Aug. 27, 2012, 2 pgs.

(Continued)

*Primary Examiner* — Agustin Bello
(74) *Attorney, Agent, or Firm* — Thomas J. Roth, Esq.

(57) ABSTRACT

An optical communication system including an optical communication fiber and a plurality of modules. Each of the modules has an optical transceiver that is optically coupled to the optical communication fiber by a corresponding optical drop. And each of the transceivers is configured for transmitting and/or receiving one or more optical signals via the optical communication fiber. The optical signals represent a plurality of individual data streams formatted according to one or more different communication protocols. In this manner, optical communication is enabled among the modules via the optical communication fiber.

29 Claims, 13 Drawing Sheets

(56) References Cited

U.S. PATENT DOCUMENTS

| | | | |
|---|---|---|---|
| 5,600,466 A | 2/1997 | Tsushima et al. | |
| 5,600,469 A | 2/1997 | Yamazaki | |
| 5,623,565 A * | 4/1997 | Blair et al. | 385/24 |
| 5,786,915 A | 7/1998 | Scobey | |
| 5,915,051 A | 6/1999 | Damask et al. | |
| 5,946,430 A | 8/1999 | Morrow et al. | |
| 5,969,840 A * | 10/1999 | Roberts | 398/32 |
| 6,009,216 A * | 12/1999 | Pruett et al. | 385/12 |
| 6,252,689 B1 * | 6/2001 | Sharp | 398/168 |
| 6,351,582 B1 | 2/2002 | Dyke et al. | |
| 6,466,341 B1 | 10/2002 | Lumish et al. | |
| 6,510,257 B1 | 1/2003 | Barwicz et al. | |
| 6,519,059 B1 | 2/2003 | Doerr et al. | |
| 6,519,064 B1 | 2/2003 | Fatehi et al. | |
| 6,552,832 B1 | 4/2003 | Beierle et al. | |
| 6,563,985 B2 | 5/2003 | Yin et al. | |
| 6,626,590 B1 | 9/2003 | Nagatsu et al. | |
| 6,654,565 B2 | 11/2003 | Kenny | |
| 6,661,973 B1 | 12/2003 | Huber et al. | |
| 6,690,873 B2 | 2/2004 | Bendett et al. | |
| 6,754,449 B2 | 6/2004 | Chang et al. | |
| 6,763,194 B2 | 7/2004 | Okuno et al. | |
| 6,778,721 B2 | 8/2004 | Jeong | |
| 6,859,572 B2 * | 2/2005 | Ishibashi | 385/16 |
| 6,888,856 B2 | 5/2005 | Green et al. | |
| 6,892,032 B2 | 5/2005 | Milton et al. | |
| 6,915,077 B2 | 7/2005 | Lo | |
| 6,937,778 B2 * | 8/2005 | Winfield et al. | 385/12 |
| 6,945,711 B2 | 9/2005 | Chen et al. | |
| 6,950,609 B2 | 9/2005 | Marom | |
| 6,972,687 B1 * | 12/2005 | Marshall et al. | 340/686.1 |
| 6,975,812 B1 | 12/2005 | Kuhara et al. | |
| 6,978,059 B2 | 12/2005 | Martin, Jr. et al. | |
| 6,982,925 B2 * | 1/2006 | Maas et al. | 367/13 |
| 6,996,307 B2 | 2/2006 | Chandrasekhar et al. | |
| 7,072,538 B1 | 7/2006 | Lipson et al. | |
| 7,085,496 B2 | 8/2006 | Kinoshita et al. | |
| 7,113,662 B2 | 9/2006 | Persson | |
| 7,113,704 B1 | 9/2006 | Lin | |
| 7,116,910 B1 | 10/2006 | Presby et al. | |
| 7,133,616 B2 | 11/2006 | Caroli | |
| 7,136,588 B1 | 11/2006 | Islam et al. | |
| 7,164,862 B1 | 1/2007 | Shi et al. | |
| 7,203,421 B2 | 4/2007 | McGuire, Jr. | |
| 7,218,813 B2 | 5/2007 | Ishii et al. | |
| 7,221,815 B2 * | 5/2007 | Smith | 385/13 |
| 7,254,337 B1 | 8/2007 | Islam et al. | |
| 7,263,245 B2 * | 8/2007 | Delcher et al. | 385/12 |
| 7,277,640 B2 | 10/2007 | Stone | |
| 7,292,786 B1 | 11/2007 | Barbarossa et al. | |
| 7,356,209 B2 * | 4/2008 | Delcher et al. | 385/12 |
| 7,412,171 B1 | 8/2008 | Glance | |
| 7,433,601 B2 | 10/2008 | Kai | |
| 7,444,055 B2 | 10/2008 | Tolstikhin et al. | |
| 7,466,918 B1 | 12/2008 | Lam et al. | |
| 7,469,082 B1 * | 12/2008 | Okorogu | 385/37 |
| 7,529,484 B2 | 5/2009 | Xu et al. | |
| 7,623,789 B2 | 11/2009 | Oberg et al. | |
| 7,627,245 B2 | 12/2009 | Jenkins et al. | |
| 7,639,909 B2 | 12/2009 | Murshid et al. | |
| 7,764,884 B2 | 7/2010 | Glance | |
| 7,856,182 B2 | 12/2010 | Boden | |
| 7,899,334 B2 | 3/2011 | Zhong et al. | |
| 7,925,166 B2 * | 4/2011 | Vogley et al. | 398/113 |
| RE42,368 E | 5/2011 | Chen et al. | |
| RE42,540 E | 7/2011 | Iazikov et al. | |
| 8,032,027 B2 | 10/2011 | Popovic | |
| 8,045,858 B2 * | 10/2011 | Truong | 398/82 |
| 8,064,766 B2 | 11/2011 | Wei et al. | |
| 8,111,992 B2 | 2/2012 | Villarruel et al. | |
| 8,126,330 B2 | 2/2012 | Wisseman | |
| RE43,226 E | 3/2012 | Iazikov et al. | |
| 8,139,905 B1 * | 3/2012 | Bazzone | 385/12 |
| 8,165,468 B2 | 4/2012 | Boduch et al. | |
| 8,184,980 B2 * | 5/2012 | Sarchi et al. | 398/108 |
| 8,340,527 B2 * | 12/2012 | Elberbaum | 398/113 |
| 8,358,893 B1 * | 1/2013 | Sanderson et al. | 385/101 |
| 8,374,506 B2 * | 2/2013 | Stark | 398/114 |
| 8,488,114 B2 * | 7/2013 | Gaspari | 356/73.1 |
| 2002/0018260 A1 | 2/2002 | Kisovec et al. | |
| 2002/0063924 A1 | 5/2002 | Kimbrough et al. | |
| 2003/0025964 A1 | 2/2003 | Herz et al. | |
| 2003/0175030 A1 | 9/2003 | Chen et al. | |
| 2004/0141751 A1 * | 7/2004 | Young | 398/107 |
| 2004/0184808 A1 | 9/2004 | Hwang et al. | |
| 2004/0190901 A1 | 9/2004 | Fang | |
| 2005/0281505 A1 * | 12/2005 | Smith | 385/24 |
| 2006/0024059 A1 | 2/2006 | Park et al. | |
| 2006/0083513 A1 | 4/2006 | Huang et al. | |
| 2008/0019698 A1 * | 1/2008 | Vogley et al. | 398/113 |
| 2008/0292313 A1 | 11/2008 | Mahony et al. | |
| 2009/0154930 A1 | 6/2009 | Hinderthuer | |
| 2009/0154932 A1 | 6/2009 | Hinderthuer | |
| 2009/0162057 A1 | 6/2009 | Friedrich et al. | |
| 2009/0169206 A1 | 7/2009 | Friedrich | |
| 2009/0196618 A1 | 8/2009 | Villa et al. | |
| 2009/0220236 A1 | 9/2009 | Dalziel | |
| 2009/0226169 A1 | 9/2009 | Wei et al. | |
| 2009/0226172 A1 | 9/2009 | Larikova et al. | |
| 2010/0080555 A1 | 4/2010 | Xu et al. | |
| 2010/0111136 A1 * | 5/2010 | Huang et al. | 374/161 |
| 2010/0266276 A1 | 10/2010 | Zheng et al. | |
| 2010/0272441 A1 | 10/2010 | Boduch et al. | |
| 2010/0284696 A1 | 11/2010 | Gao | |
| 2010/0290781 A1 | 11/2010 | Overton et al. | |
| 2011/0103796 A1 | 5/2011 | Mazzini et al. | |
| 2011/0211832 A1 | 9/2011 | Schunk | |
| 2012/0128364 A1 * | 5/2012 | Cousineau | 398/110 |
| 2012/0189298 A1 * | 7/2012 | Ohad et al. | 398/9 |
| 2012/0288281 A1 * | 11/2012 | Camino et al. | 398/84 |
| 2013/0022357 A1 * | 1/2013 | Blodorn et al. | 398/110 |

OTHER PUBLICATIONS

Written Opinion for PCT Application No. PCT/US12/37331 dated Aug. 27, 2012, 7 pgs.
White Paper, Transformation of the Enterprise Network Using Passive Optical LAN, May 2009, 13 pgs.

* cited by examiner

MULTI-DROP OPTICAL COMMUNICATION

CROSS-REFERENCE TO RELATED APPLICATION

This patent application claims priority to U.S. Provisional Patent Application No. 61/484,560, filed May 10, 2011, entitled "Multi-Wavelength, Multi-Drop Communications over Polymer Optical Fiber," the entire disclosure of which is incorporated herein by reference.

BACKGROUND

Optical communication involves propagating a light signal through an optical fiber. While a variety of encoding and/or modulating techniques may be employed, a simple optical signal may represent binary values by its on and off states. For example, the presence of light during a time interval may indicate a '1' value and the absence of light during a time interval may indicate a '0' value.

Conventional optical communication systems comprise optical fiber and nodes. A node receives an optical signal via an optical fiber, converts the optical signal to an electrical representation, and then processes the electrical signal in some manner in the electrical domain. The node then converts the electrical representation back to an optical signal and re-transmits the optical signal via the same or another optical fiber. For example, a node may act as a relay that restores the amplitude of the optical signal if it is undesirably attenuated when transmitted through an extended length of optical fiber. Alternatively, a node may provide some kind of signal processing functionality and/or bridging between disparate communications protocols, such as between an optical fiber-based telephony system and a copper wire-based telephony system.

Modern industrial process control systems rely on a highly architected suite of devices and systems for the proper transport of data from, for example, one plant location to another. In the electrical realm, this had led to including switches, hubs and routers. There is a need for a system that reduces the number of IT electrical switching equipment and allows for multiple devices to be easily connected and disconnected from the transport network's physical medium while remaining inherently secure. Preferably, the system should also allow for the transport of multiple protocols among all devices connected to the network.

SUMMARY

Briefly described, an optical communication system embodying aspects of the invention includes an optical communication fiber and a plurality of modules. Each of the modules has an optical transceiver that is optically coupled to the optical communication fiber by a corresponding drop. And each of the transceivers is configured for transmitting and/or receiving one or more optical signals via the optical communication fiber. The optical signals represent a plurality of individual data streams formatted according to one or more different communication protocols. In this manner, optical communication is enabled among the modules via the optical communication fiber.

An optical communication system according to another aspect comprises an optical communication fiber and three modules. The first module comprises a first optical transceiver, wherein the first module is optically coupled to the optical communication fiber by a first drop. The second module comprises a second optical transceiver, wherein the second module is optically coupled to the optical communication fiber by a second drop. The third module comprises a third optical transceiver, wherein the third module is optically coupled to the optical communication fiber by a third drop. Optical communication is enabled between the first module, the second module, and the third module via the optical communication fiber.

In an aspect, an optical communication system comprises a polymer optical fiber (POF) and two modules. The first module comprises a first optical transceiver, wherein the first module transmits a first optical signal having a first wavelength on the POF. The second module comprises a second optical transceiver, wherein the second module transmits a second optical signal having a second wavelength on the POF and wherein the second wavelength is different from the first wavelength.

A method of communication embodying aspects of the invention comprises transmitting a first optical signal having a first wavelength on a first POF, wherein the first wavelength is allocated for a first category of communication and transmitting a second optical signal having a second wavelength on the first POF, wherein the second wavelength is allocated for a second category of communication. The method further comprises separating the first optical signal from the second optical signal based on the first wavelength, and, after separating the first optical signal, receiving the first optical signal.

According to yet another aspect, an optical communication system comprises a polymer optical fiber, a plurality of optical transceivers, a plurality of optical drops, and a plurality of processors. Each of the optical transceivers is configured for transmitting and/or receiving one or more optical signals via the optical fiber. The optical signals represent a plurality of individual data streams each formatted according to a different communication protocol. The plurality of optical drops couple the optical transceivers to the optical fiber, each of the optical drops corresponding to one of the optical transceivers. And each of the processors is configured for executing a control application to control one or more process control devices in an industrial plant and corresponds to one of the optical transceivers. In this manner, optical communication is enabled among the process control devices via the optical fiber.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An optical communication system is taught herein. While the optical communication system is described below in the context of an industrial control system environment, it will be appreciated by one of ordinary skill in the art that the optical communication system may be used in a wide variety of other applications.

One embodiment of the present invention is an optical communication system that includes an optical communication fiber and a plurality of modules. A typical optical fiber is made from glass and has a transparent core surrounded by a cladding material. Total internal reflection keeps light within the core. According to aspects of the invention, the optical communication fiber is a polymer optical fiber (POF).

Figure 1:
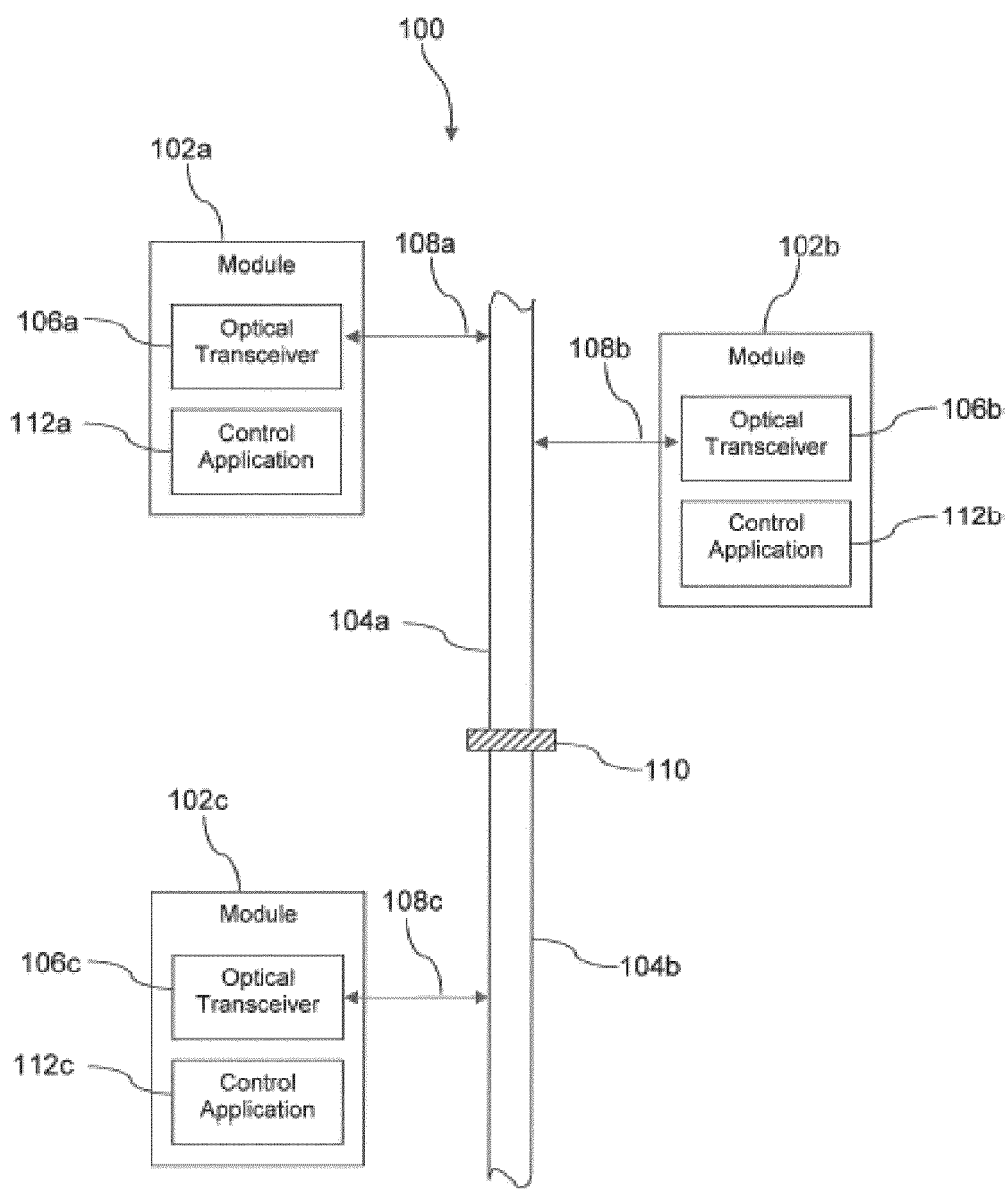
FIG. 1 is an illustration of a communication system according to an embodiment of the invention.

Referring now to FIG. 1, a "drop" architecture embodying aspects of the invention implements multiple communication path physical connections. In FIG. 1, an optical communication system 100 comprises a plurality of modules 102 that are optically coupled to an optical line 104. Each module 102 in the illustrated embodiment comprises an optical transceiver 106 that couples the module 102 to the optical line 104 via a drop 108. For example, a first module 102a comprises a first optical transceiver 106a that couples the first module 102a to the optical line 104 by a first drop 108a; a second module 102b comprises a second optical transceiver 106b that couples the second module 102b to the optical line 104 by a second drop 108b; and a third module 102c comprises a third optical transceiver 106c that couples the third module 102c to the optical line 104 by a third drop 108c. It is to be understood that system 100 could include any number of modules and drops implemented in this manner.

According to aspects of the invention, drop 108 couples each of the modules 102 to the optical fiber 104. Once the first module 102a is optically coupled to the optical fiber 104, the corresponding optical transceiver 106a can receive optical signals transmitted via the optical fiber. In addition, optical transceiver 106a can introduce optical signals onto optical fiber 104 for transmission. Second and third modules, for example, may be configured in the same manner, where the drop associated with each module couples it to the same optical fiber. In this configuration, the system enables optical communication among the modules via the optical fiber.

In the embodiments described herein, the optical fiber 104 may include a cladding (see FIG. 2) affixed to its exterior at a point opposed to the drop used to optically couple the module to the optical communication fiber. The cladding generally promotes better coupling between the first drop and the optical communication fiber, so that the light transmitted by the optical transceiver is optimally introduced onto the optical communication fiber. The cladding is, for example, a reflective material.

According to aspects of the invention, each module 102 can transmit different optical signals having different wavelengths as well as receive different optical signals having different wavelengths using, for example, wavelength division multiplexing (WDM). WDM can be used in a distributed control system to control multiple field devices, with each optical signal of a different wavelength providing information regarding a particular device or set of devices. In other words, WDM permits the available bandwidth to be subdivided into several channels. This is especially valuable in an industrial process control systems, which transports data from, for example, one plant location to another and from one device to another using a variety of different communication protocols.

In this embodiment, the optical transceivers 106 of the various modules 102 transmit optical signals having different wavelengths. And the different wavelengths may be allocated for different categories of communication according to WDM technologies. For example, a dispersive element such as a wavelength selective device, such as a filter, prism, diffraction grating, or the like can be used to separate optical signals having differing wavelengths.

Alternatively, a form of Time Division Multiple Access (TDMA) or Frequency Division Multiple Access (FDMA) may be used to allow the optical fiber to simultaneously carry a plurality of signals.

The optical communication system embodying aspects of the invention provides at least a portion of the communications among process control equipment housed within an equipment cabinet. In an embodiment, different wavelengths of light are used to transmit and receive different categories of process control information. For example, safety information may be communicated using a first wavelength of light signal, security information may be communicated using a second wavelength of light signal, control command information may be communicated using a third wavelength of light signal, and so with other categories of information. An optical communication bus or optical line may be implemented having a plurality of optical fibers where different portions of the optical communication bus or optical line are segregated by optical filters. For example, a first segment of the optical communication bus promotes communication with six different light wavelengths including a sixth wavelength associated with security information and a second segment of the optical communication bus is coupled to the first segment by a filter that blocks propagation of the sixth wavelength of light from the first segment into the second segment.

Turning now to FIG. 1 in greater detail, in an embodiment, the optical line 104 comprises a plurality of segments implemented by optical fibers that are coupled to each other. For example, the optical line 104 comprises a first optical line segment 104a and a second optical line segment 104b optically coupled to each other by a filter 110. The optical line segments 104a, 104b may be any optical fiber. In an embodiment, the segments 104a, 104b are glass optical fibers. In an alternative embodiment, the segments 104a, 104b are polymer optical fibers. In yet another embodiment, one of the segments 104a, 104b is a glass optical fiber and the other segment 104a, 104b is a POF. Light in the first segment 104a propagates in one direction (i.e., downward with reference to the orientation illustrated in FIG. 1), passes through the filter 110, and continues to propagate in the second segment 104b.

In various control applications contemplated for some embodiments of the system 100, the optical communication line 104 is of relatively limited length, for example less than 100 meters. In this application, polymer optical fibers may provide cost savings and ease of deployment with reference to glass optical fibers. The procedures for splicing polymer optical fibers entail less exacting alignment than splicing glass optical fibers. Additionally, polymer optical fibers tolerate tighter turns than glass optical fibers. While a single optical line 104 is illustrated in FIG. 1, it is understood that the system 100 may have a plurality of optical lines 104. In an embodiment, one optical line 104 may be dedicated for one direction of communication, for example from a distributed control system (DCS) to field devices and a second optical line 104 may be dedicated for a second direction of communication, for example from field devices to the distributed control system.

The first optical transceiver 106a in the illustrated embodiment of FIG. 1 transmits a first optical signal via the first drop 108a onto the first segment 104a. The first optical signal propagates (e.g., downward) in the first segment 104a, passes through the filter 110, and continues to propagate in the second segment 104b. Part of the first optical signal may enter the third drop 108c and be received by the third optical transceiver 106c. It is understood that at least a portion of the first optical signal may also propagate in the other direction (e.g., upward) in the first segment 104a. The third optical transceiver 106c may transmit a second optical signal via the third drop 108c onto the second segment 104b. The second optical signal in this embodiment propagates (e.g., upward) in the second segment 104b, passes through the filter 110, and continues to propagate in the first segment 104a. Part of the second optical signal enters the first drop 108a and is received by the first optical transceiver 106a. It is understood that at least a portion of the second optical signal may also propagate in the other direction (e.g., downward) in the second segment 104b.

In a similar manner, the second optical transceiver 106b is capable of transmitting a third optical signal via the second drop 108b onto the first segment 104a. The third optical signal in one embodiment propagates in both directions (i.e., upward and downward) in the first segment 104a. Thus, the third optical signal may propagate upward in the first segment 104a, and part of the third optical signal may enter the first drop 108a and be received by the first optical transceiver 106a. At the same time, the third optical signal may propagate downward in the first segment 104a, pass through the filter 110, and continue to propagate downward in the second segment 104b. Part of the third optical signal may enter the third drop 108c and be received by the third optical transceiver 106c.

Communication on the optical line 104 preferably comprises optical signals at different wavelengths, for example using WDM techniques. In an embodiment, different categories of information may be transmitted and received on different wavelengths. For example, security type of information may be transmitted on the optical line 104 in a first optical signal having a first wavelength, safety information may be transmitted on the optical line 104 in a second optical signal having a second wavelength, control command information may be transmitted on the optical line 104 in a third optical signal having a third wavelength, and sensor data may be transmitted on the optical line 104 in a fourth optical signal having a fourth wavelength. It is to be understood that other categories of information may be communicated over the optical line 104. Additionally, the example categories of information may be further subdivided, and communication associated to each subdivided information category may be allocated to individual wavelengths. For example, different priorities may be associated with control command information, and a first optical wavelength may be allocated for communicating priority 1 control commands, a second optical wavelength may be allocated for communicating priority 2 control commands, and a third optical wavelength may be allocated for communicating priority 3 control commands. Any number of different optical wavelengths may be used for communicating over the optical line 104.

Some optical transceivers 106 and/or some drops 108 such as those shown in FIG. 1 may not be configured to receive or transmit on some optical wavelengths that are used for communicating over the optical line 104, for example in the case that a category of information associated with the subject optical wavelength is irrelevant to the subject module 102. As a result, the drop 108 and/or the optical transceiver 106 may be a lower cost unit. Alternatively, the optical transceiver 106 and/or the module 102 may experience a reduced processing load by not receiving and/or processing unwanted optical signals.

In some cases it may be desirable to isolate a module 102 from a category of information, for example to isolate a module 102 from privileged security information. The filter 110 may block or attenuate propagation of an optical wavelength associated with security type information, and the subject module 102 may be coupled to the second segment 104b. The filter 110 is used, for instance, to subdivide the optical line 104 to promote increased bandwidth. As an example, if the filter 110 blocks propagation of a first optical wavelength, some modules 102 coupled to the first segment 104a may communicate using the first optical wavelength on the first segment 104a at the same time that other modules 102 coupled to the second segment 104b may communicate using the same first optical wavelength on the second segment 104b.

Referring further to FIG. 1, in an embodiment, one or more of the modules 102 further comprises a control application 112 that executes on a processor of the module 102. For example, the first module 102a comprises a first control application 112a, the second module 102b comprises a second control application 112b, and the third module 102c comprises a third control application 112c. The control application 112 may execute instructions that promote monitoring and/or controlling process control devices in an industrial plant such as an oil refinery, a chemical processing plant, an electrical power generation plant, a brewery, a food processing plant, a glass manufacturing plant, or other industrial plant. The process control devices may include motors, valves, heaters, conveyors, agitators, and other devices. The control application 112 in this example executes, at least partly, as an iterative, repeating control loop. The control applications 112 associated with different modules 102 may execute different sets of instructions and may be associated with different levels of responsibility. For example, the third control application 112c may execute instructions to control a turbine speed while the first control application 112a may execute instructions to control a plurality of modules 102, such as the third module 102c.

One or more of the modules 102 may be located in an industrial environment that experiences elevated temperatures, for example as a result of proximate industrial processes. As such, some of the components of the modules 102 or of the drops 108 are preferably selected for use in such elevated temperature environments. Additionally, portions of the system 100 may be used in hazardous environments where the non-sparking property of optical communications and the optical line 104 may provide safety benefits.

Figure 2:
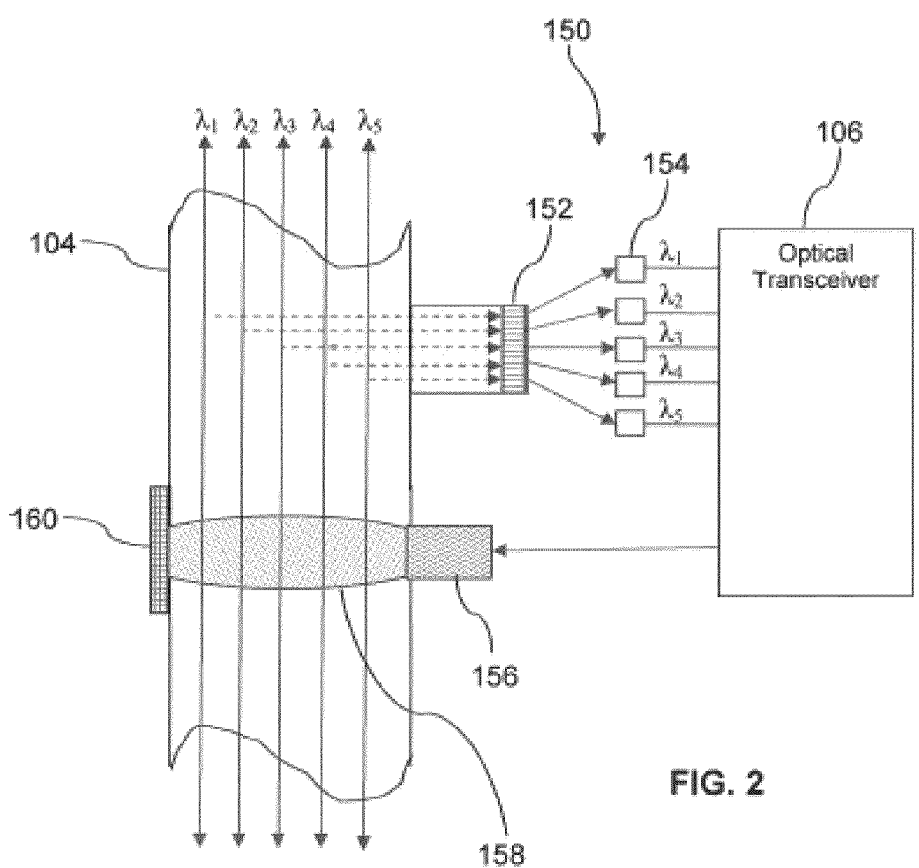
FIG. 2 is an illustration of an optical drop for use in the communication system of FIG. 1 according to an embodiment of the invention.

Turning now to FIG. 2, a drop 150 embodying aspects of the invention is described. The drops are preferably butted up against the optical fiber in a non-intrusive fashion such that light received by the drop is light that is normally radiated from the optical fiber. The drops may be butted up against the optical fiber so as to maintain an acute angle between the axis of the drop and the axis of the optical fiber below a maximum angle associated with effective introduction of light onto the optical fiber. The drop 150 comprises a separator 152 and one or more optical detectors 154. In an embodiment, the drop further comprises one or more emitters 156. In some embodiments, the drop 150 may comprise each of the separator 152, the optical detectors 154, and the emitter 156. In other embodiments, the drop 150 may comprise the separator 152 and one or more optical detectors 154 and may not comprise the emitter 156. Alternatively, in another embodiment, the drop may comprise the emitter 156 and may not comprise either the separator 152 or the optical detectors 154.

The separator 152 comprises, for example, a diffraction grating, a prism, or other optical component that is effective for separating light according to wavelength. In other words, drop 150 preferably includes a component for separating the WDM optical signal, which includes a plurality of wavelengths, into its individual wavelength components. As illustrated in FIG. 2, optical communication is carried over five different wavelengths on the optical line 104, but it is to be understood that either fewer or greater number of wavelengths may be used to communication on the optical line 104. Light that is propagating in the optical line 104 may radiate from the optical line 104 at any point along its entire length. This passively radiated light propagates to the separator 152 which directs different wavelengths of light at different angles with reference to the surface of the separator 152.

Each of the optical detectors 154 in the illustrated embodiment is located at a position so as to detect one of the wavelengths of light. Preferably, the light detectors 154 are each aligned with the path of one of the separated wavelength signals. The output of the detectors 154 are electrical signals that may be processed by the optical transceiver 106 to receive the communication encoded on the subject optical wavelength. The detectors 154 may be implemented by photodetectors or the like. It is to be understood that either fewer or more detectors 154 may be present in the drop 150 depending on the number of wavelengths of light used for communicating on the optical line 104. In an embodiment, there may be other passive optical components in the path between the optical line 104 and the separator 152 and/or between the separator 152 and the optical detectors 154, for example a lens structure.

As described above, separator 152 in one embodiment butts up against the optical line 104. It is to be understood that the separator 152 may be coupled to the optical line 104 by an appropriate interfacing material such as a light coupling gel or other material. Alternatively, the separator 152 may be coupled to a short stub of optical fiber, and the optical fiber may be coupled to the optical line 104, for example the optical fiber stub may be fused or glued to the optical line 104.

The emitter 156 of FIG. 2 emits light that is introduced into the optical line 104 in response to an electrical signal input provided to the emitter 156 from the optical transceiver 106. The emitter 156 may be implemented by a laser diode, a photodiode, or another light emitting device. In an embodiment, emitter 156 emits light 158 in a beam that is somewhat directional. The emitter 156 may be butted up against the optical line 104 or it may be coupled to an optical fiber stub, and the optical fiber stub may be coupled to the optical line 104, for example fused to the optical line 104. The emitter 156 may be coupled to the optical line 104 by an appropriate interfacing material such as a light coupling gel or other material.

As shown in FIG. 2, a portion of cladding material 160 is positioned on the surface of the optical line 104 opposed to the location of the emitter 156. The cladding material 160 is, for example, a reflective or mirror-like material. The cladding material 160 in one embodiment also has wavelength selective behavior, for example reflecting one or more specific wavelengths of light and absorbing other wavelengths of light. Alternatively, the cladding material 160 is an absorptive material such as a black colored material. Various cladding materials 160 have been observed to improve the coupling of the emitted light 158 into the optical line 104.

Referring further to FIG. 2, each emitter 156 emits light primarily at a single wavelength or within a narrow band of frequencies, which may be referred to in some contexts as monochromatic light. Hence, for the optical transceiver 106 to transmit on a plurality of optical wavelengths, the drop 150 comprises a plurality of emitters 156, each emitter 156 tuned to emit at the appropriate wavelength. The drop 150 may be conceptualized as an optical to electrical interface and/or transducer because it converts signals from the optical domain to the electrical domain and from the electrical domain to the optical domain.

In an embodiment, the drop 150 may be affected at least in part by a mechanical assembly (not shown) that clamps the drop to the optical fiber 104 at the desired angle. The mechanical assembly comprises in one embodiment a segment of cladding that engages the optical fiber opposed to the drop, where the segment of cladding increases the effectiveness of introduction of light from the drop into the optical fiber. In an alternative embodiment, drop 150 may be affected at least in part by a mechanical assembly that clamps the drop to the optical fiber 150 as a circuit module and/or circuit board is plugged into an equipment cabinet backplane, where the optical fiber may be a component of the backplane and may link a plurality of circuit boards plugged into the same equipment cabinet.

Figure 3:
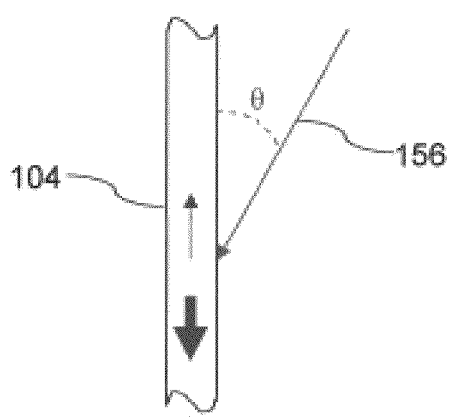
FIG. 3 is an illustration of an insertion angle of a portion of the optical drop of FIG. 2 according to an embodiment of the invention.

Turning now to FIG. 3, an angle made by the junction of the emitter 156 with the optical line 104 is described. Depending on the method of coupling the emitter 156 to the optical line 104, a maximum coupling angle $\theta$ is expected to provide acceptable coupling of the emitted light 158 into the optical line 104. In other words, acceptable coupling of the emitter 156 to the optical line 104 is achieved if the angle formed by the emitter 156 and the axis of the optical line 104, i.e., the launch angle, is less than the maximum coupling angle $\theta$ that depends on the method of attaching the emitter 156 to the optical line 104. In an embodiment, the maximum coupling angle $\theta$ is in the range of about 10° to about 15°. In combination with the present disclosure, one of ordinary skill in the art will be able to determine the maximum coupling angle $\theta$ without undue experimentation. In some contexts, the angle made between the emitter 156 and the axis of the optical line 104 may be referred to as an insertion angle.

It is to be understood that while the majority of the emitted light 158 propagates in the direction most aligned with the insertion angle, some of the emitted light 158 propagates in the opposite direction. These directions are illustrated in FIG. 3 by the heavy arrow, aligned with the insertion angle, and the light arrow, directed oppositely to the heavy arrow. Also, the light propagating in the optical line 104 may reflect off an end or termination of the optical line 104 and propagate back in the reverse direction.

In an embodiment, a mechanical structure (not shown) is used to couple the drop 150 to the optical line 104. The mechanical structure may comprise the separator 152, the detectors 154, the emitters 156, and/or the cladding material 160. Preferably, the mechanical structure promotes maintaining appropriate positions and angles of the several optical components of the drop 150. In some contexts, this mechanical structure may be referred to as an optical clamp or as a vampire clamp.

Figure 4:
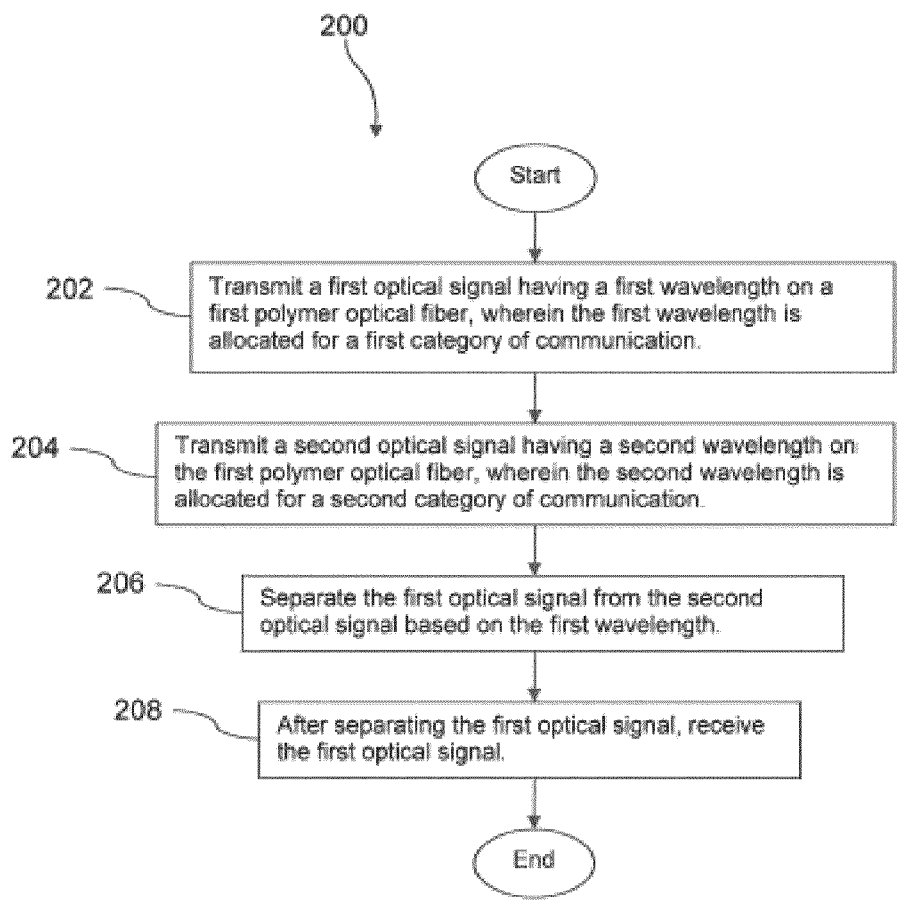
FIG. 4 is a flow chart illustrating a method according to an embodiment of the invention.

Turning now to FIG. 4, a method 200 embodying aspects of the invention is described. As described above, optical communication fiber 104 preferably comprises a POF. At block 202, a first optical signal having a first wavelength is transmitted on a first POF, wherein the first wavelength is allocated for a first category of communication. For example, a first optical signal, such as a control command, is transmitted on the optical line 104 by the first optical transceiver 106a. At block 204, a second optical signal having a second wavelength is transmitted on the first POF, wherein the second wavelength is allocated for a second category of communication. For example, a second optical signal, such as a safety-related message, is transmitted on the optical line 104 by the second optical transceiver 106b. At block 206, the first optical signal is separated from the second optical signal based on the first wavelength. At block 208, after separating the first optical signal, the first optical signal is received. For example, the third drop 108c separates the first optical signal from the second optical signal, and the third optical transceiver 106c receives the first optical signal and the second optical signal.

In an embodiment, the third control application 112c processes the second optical signal at a higher priority than the first optical signal due to the communication category associated with the second optical signal versus the communication category associated with the first optical signal. For example, the third control application 112c may be configured to process and respond to a safety-related message before processing a control command message.

As described above, aspects of the invention provide a system for transporting multiple forms of data traffic along a POF. Several protocols, which are co-resident with each other on the POF, use different wavelengths for signal separation. Devices are readily added or removed from the POF through the use of a multi-drop signal injection/extraction technique. The active photonic sources and detectors are within the devices and are used in conjunction with optical devices and techniques for efficient data transport.

The following non-limiting examples are provided to further illustrate aspects of the present invention relating to distinguishing signals and protocols co-residing on the optical fiber 104. For example, the optical field emanating from a photonic transmitter (e.g., laser, laser diode, light emitting diode, etc.) is described in Equation 1.

$$I(t)=I_0(t)e^{[j\omega t+\phi(t)]} \quad \text{Eq. 1.}$$

where $I_0(t)$ is the time varying intensity modulation of the light source,

ω is the radian frequency of the emitted light,
t is time, and
φ(t) is the phase of the emitted light.

In terms of wavelength, rather than the frequency notation of Equation 1, the field is as described in Equation 2.

$$I(t)=I_0(t)e^{[j(2\pi\lambda/c)t+\phi(t)]} \quad \text{Eq.2.}$$

where λ is the wavelength of the emitted light, and
c is the speed of light.

Figure 5:
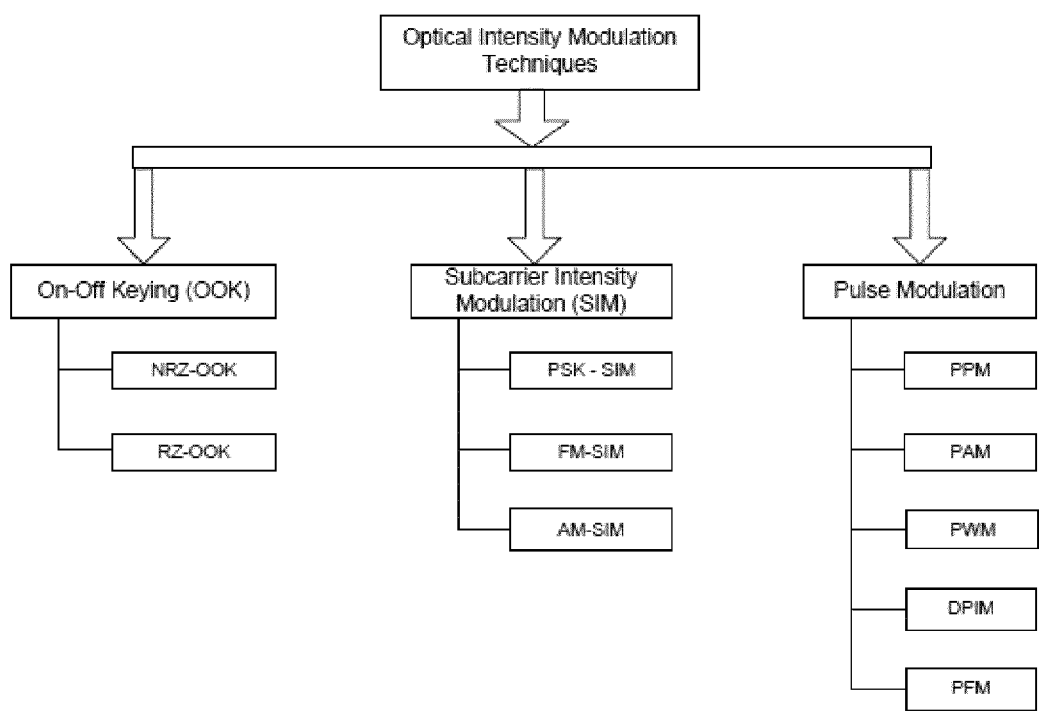
FIG. 5 is a block diagram of optical intensity modulation schemes for use with embodiments of the invention.

According to an embodiment of the invention, only intensity modulation, i.e., manipulation of the time-varying $I_0(t)$ term, is used. A description of the variety of optical intensity modulation schemes applicable for embodiments of the invention is shown in FIG. 5.

A traditional use of WDM fiber optic communications is for parallel data streams to co-reside within optical fiber 104. Aspects of this invention are similar to traditional WDM in that multiple data streams, each with its unique wavelength, are within an optical fiber. Advantageously, however, aspects of the invention improve upon traditional WDM (and conventional industrial process communications) in that individual data streams carry different communication protocols. The isolation of the protocols eliminates interference and prioritization conflicts between information conveyed through different protocols.

Current Ethernet protocols, on the other hand, rely on point-to-point connectivity; both for copper-based media and glass-based optical media. Point-to-point connectivity requires the use of switches to allow nodes in the network to communicate. The use of switches increases both the cost and complexity of a system as well as reduces reliability. The use of polymer optical fiber for the transport media allows nodes to connect into the communication fiber through side mount connections without interruption to the communication fiber. The side mount connectivity supports a multi-drop environment and, thus, reduces the number of switches required by the system.

With respect to signal transmission, the multiple data streams, with potentially unique protocols, rely on intensity modulation of the optical transmitter, i.e., subcarrier intensity modulation. In an embodiment of the invention, amplitude modulated subcarrier intensity modulation is used. The analog amplitude modulation time-varying signal, $I_0(t)$, of Equation 2 becomes Equation 3 (written in cosine versus exponential notation).

$$I_0(t)=I_s(1+m\cos\omega_m t)\cos[(2\pi\lambda_{sc}/c)t] \quad \text{Eq.3.}$$

where m is the modulation extinction level (between 0 and 1),
$\omega_m$ is the mean radian frequency of the message, and
$\lambda_{sc}$ is the optical carrier wavelength.

Figure 6:
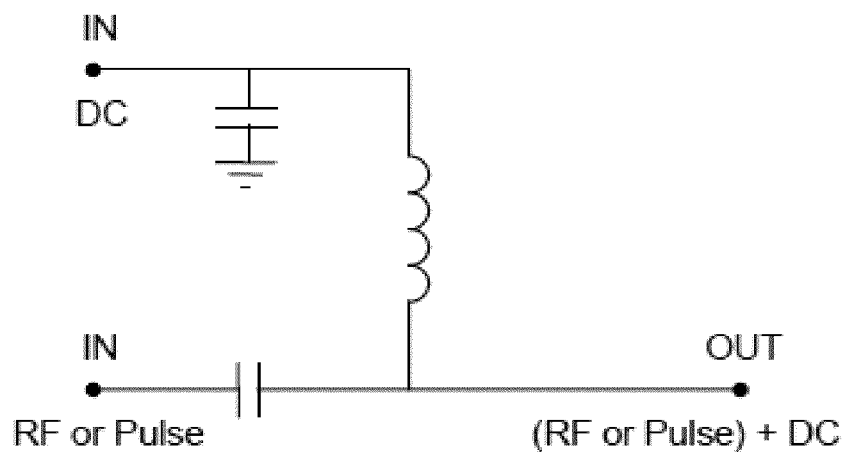
FIG. 6 is a schematic of a bias insertion circuit according to an embodiment of the invention.

Modulation of the light source, such as the instance in which laser diodes (LDs) or light emitting diodes (LEDs) are used as described above, relies on a standard bias insertion circuit shown in FIG. 6 for blocking DC (bias) from the RF/pulse signal source. Similarly, an inductor blocks the RF/pulse from the DC source. This allows the LD/LED to be biased into its higher optical output operating region. The bias current also acts as a form of protection for the data sequence. This is because applying AC (about 0V) directly to the LD/LED, would place the device into a reverse-bias operation on each half cycle. If the pulse source is designed for a 50Ω impedance, then the bias insertion circuit shown in FIG. 6 can be augmented by the addition of 47Ω chip resistor in series with the LD.

Figure 7:
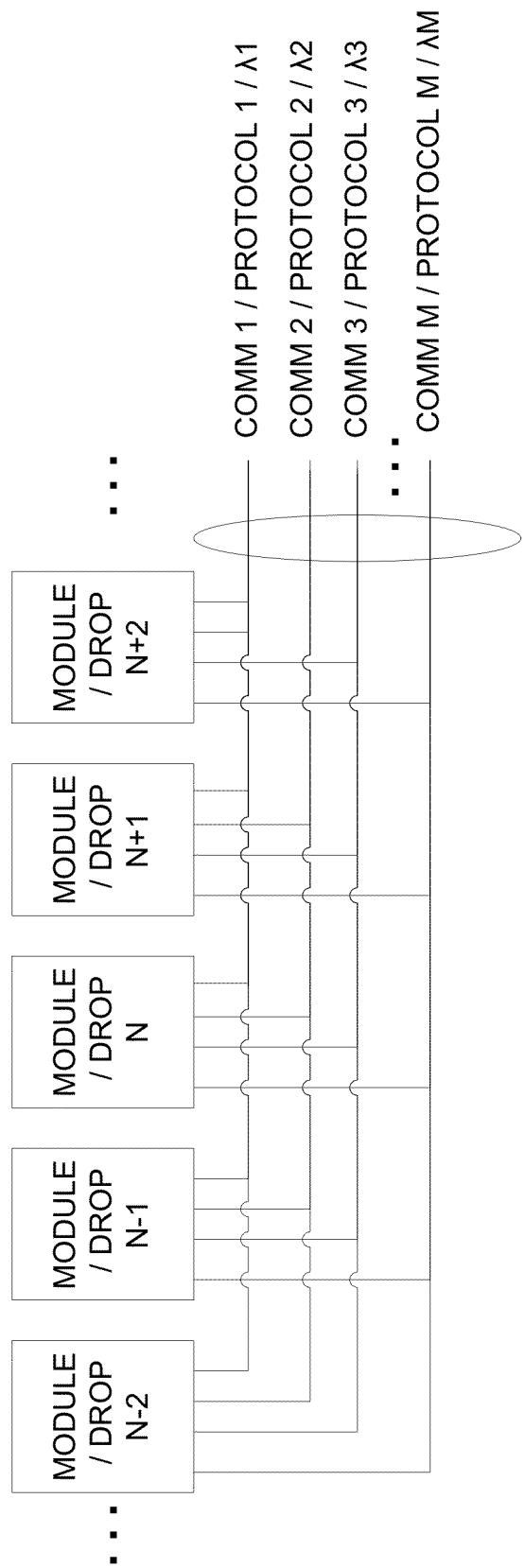
FIG. 7 illustrates multiple communication path physical connections in the communication system of FIG. 1 in which a plurality of parallel data streams have individual wavelengths and protocols according to an embodiment of the invention.

FIG. 7 illustrates multiple communication path physical connections in communication system 100 in which parallel data streams have individual wavelengths and protocols. Digital signals may be conveyed as an amplitude-shift keying (ASK) stream with the modulation extinction factor, m, in Equation 1, which is a time varying value m(t) that varies as the 1/0 data varies. In this manner, multiple intensity-based protocols (data streams) may be applied to sources with different light wavelengths, λ, or in radian frequency notation, ω, with the light injected into the POF. The result is a virtual set of parallel channels of data traffic within the POF as illustrated in FIG. 7.

Figure 8:
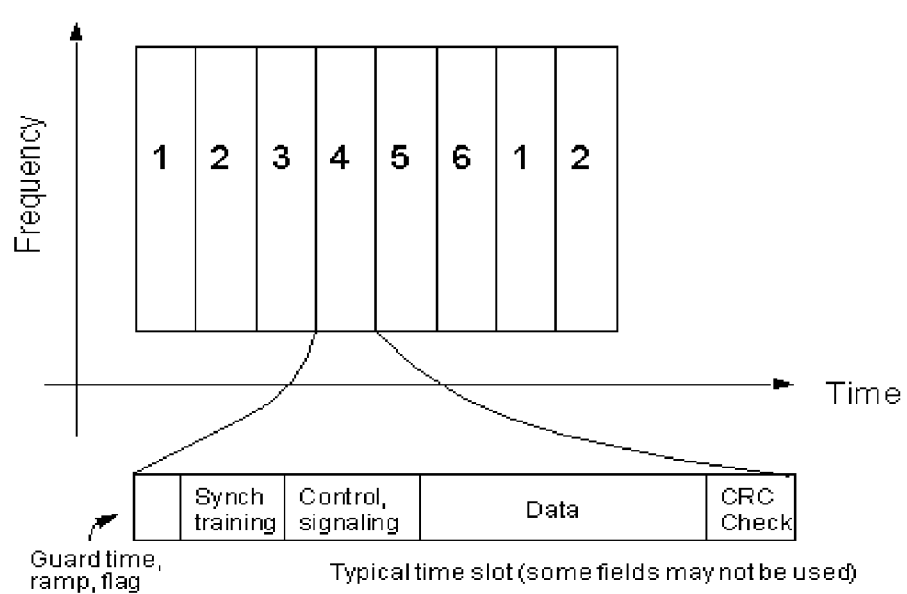
FIG. 8 illustrates a plurality of parallel data streams sharing a single channel via time division multiplexing according to an embodiment of the invention.

FIG. 8 illustrates a plurality of users (e.g., six) sharing a single channel via time division multiplexing. The individual messages (e.g., Comm 3/Protocol 3) may be multiplexed prior to modulation of the optical source. TDMA is particularly useful where there is a single frequency (or band) available for use. The multiple users each share this resource, with the conceptually simplest method being to take turns using the transmission channel. An illustration of TDMA is presented in FIG. 8 where six users share a single frequency interval, $\omega_m$. And when any individual user has control of the channel, the actual transmission does not have to mimic that shown in this figure (although it does fit into the allocated temporal period). In an embodiment of the invention, a number of synchronization signals placed at the leading positions (header) of the message indicate to whom the message is bound, etc. This header information is followed by the actual data which is then followed by some form of error control checking (a cyclic redundancy checksum is illustrated in this figure).

Multiple users, six in FIG. 8, with differing data packet structures yields a message stream, $I_0(t)$, that may be highly complicated, yet easily used to modulate the output from a photonic source at a single wavelength, $\lambda_n$. By using this structure, aspects of the invention allow for parallel channels of multiplexed TDMA traffic such as Ethernet, Profibus, Modbus, and many other industrial protocols to be all co-resident on the optical fiber 104.

Figure 9A:
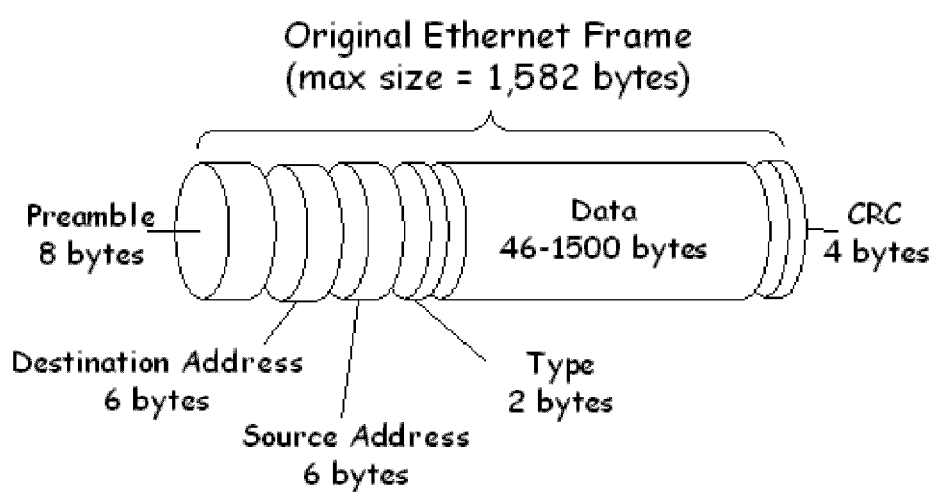
FIG. 9A and FIG. 9B illustrate exemplary Ethernet and ModBus/TCP frame structures, respectively, for modulating a light source according to embodiments of the invention.
Figure 9B:
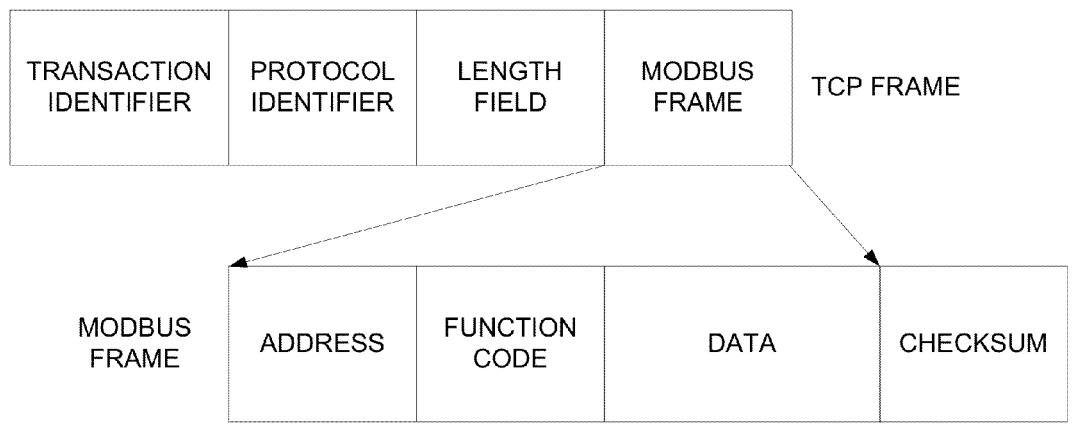

FIG. 9A and FIG. 9B illustrate exemplary Ethernet and ModBus/TCP frame structures, respectively, embodying aspects of the invention. In an embodiment, an Ethernet frame and a ModBus/TCP frame may be used to modulate the light source. The data sequence modulates the light source with the resultant signal being coupled into the POF. TDMA requires each device on the network to have a fairly accurate clock synchronization for allowing the node to know when to access the channel. The TDMA data field typically includes node ID and start/stop bits. Examples of TDMA data frames for Ethernet and ModBus are presented in FIGS. 9A and 9B.

Frequency modulation intensity modulation of the light signal may also be achieved for distinguishing signals and protocols co-residing on the optical fiber 104. The situation is described by Equation 4.

$$I_0(t)=I_s \cos\,[(2\pi\lambda_{sc}/c)t+\beta \sin \omega_m t)]] \qquad \text{Eq.4.}$$

where β is the modulation index (between 0 and 1).

Digital 1/0 information may be conveyed as frequency-shift keying (FSK) with set frequencies for 1's and 0's. In this regard, frequency division multiplexing permits the available bandwidth to be subdivided into several channels. FDMA data traffic may also be used to modulate the light source. For systems using FDMA, the available bandwidth that the optical carrier light source can provide is subdivided into a number of narrower band channels. Each user is allocated a unique frequency band in which to transmit and receive on.

With respect to cellular telephony, for example, during a call, no other user can use the same frequency band. Each user is allocated a forward link channel (from the base station to the mobile phone) and a reverse channel (back to the base station), each being a single way link. The transmitted signal on each of the channels is continuous allowing analog transmissions. The channel bandwidth used in most FDMA systems is typically low (e.g., 30 kHz for most telephony applications) as each channel only needs to support a single user. According to embodiments of the present invention, data signals are transmitted. The bandwidth of each user (source of data) is indeterminate with an approximate value of 200 MHz (100 Mbps) each. The limit is determined by the electrical modulation bandwidth of the photonic transmitter and detector. According to an embodiment of the invention, FDMA is used as the primary subdivision of large allocated frequency bands and is used as part of most multi-channel systems.

Digital modulation requires a wider bandwidth than FSK or ASK. For this reason, an adequate bandwidth transmitter is used in the embodiment described above. Return-to-zero, non-return-to-zero, pulse-position modulation, and other forms of digital modulation are variants on amplitude modulation and can be performed with the multi-drop optical communication system embodying aspects of the invention. Therefore data formats such as Ethernet, Profibus, ModBus, and other industrial bus protocols may be transported across the POF as isolated or multiplexed data streams. Each protocol is transmitted in its own data stream providing isolation from interference and supporting message prioritization.

Figure 10:
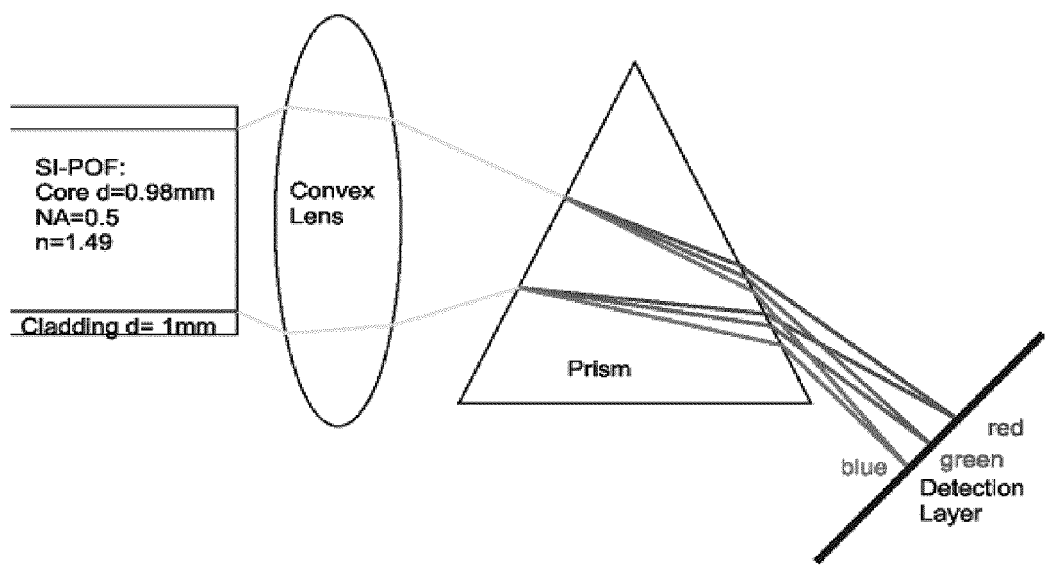
FIG. 10 illustrates a photodetector for recovering multiplexed signals according to an embodiment of the invention.

With respect to signal detection, FIG. 10 illustrates placing a photodetector in the "detector plane" to allow the multiplexed signals to be recovered. This embodiment achieves the multi-wavelength signal detection by placing a photodetector at the correction spatial (angular) position in the dispersed optical beam, as shown in FIG. 10. The spatial/angular position corresponds to a specific wavelength. A photodetector placed at that location converts the photons to an electrical signal and the message (see Equation 2) is retrieved.

While FIG. 10 shows the color separation as the light emerges from the end of the fiber, the same demultiplexing principle is used if the light is emitted from the side of the fiber.

Figure 11:
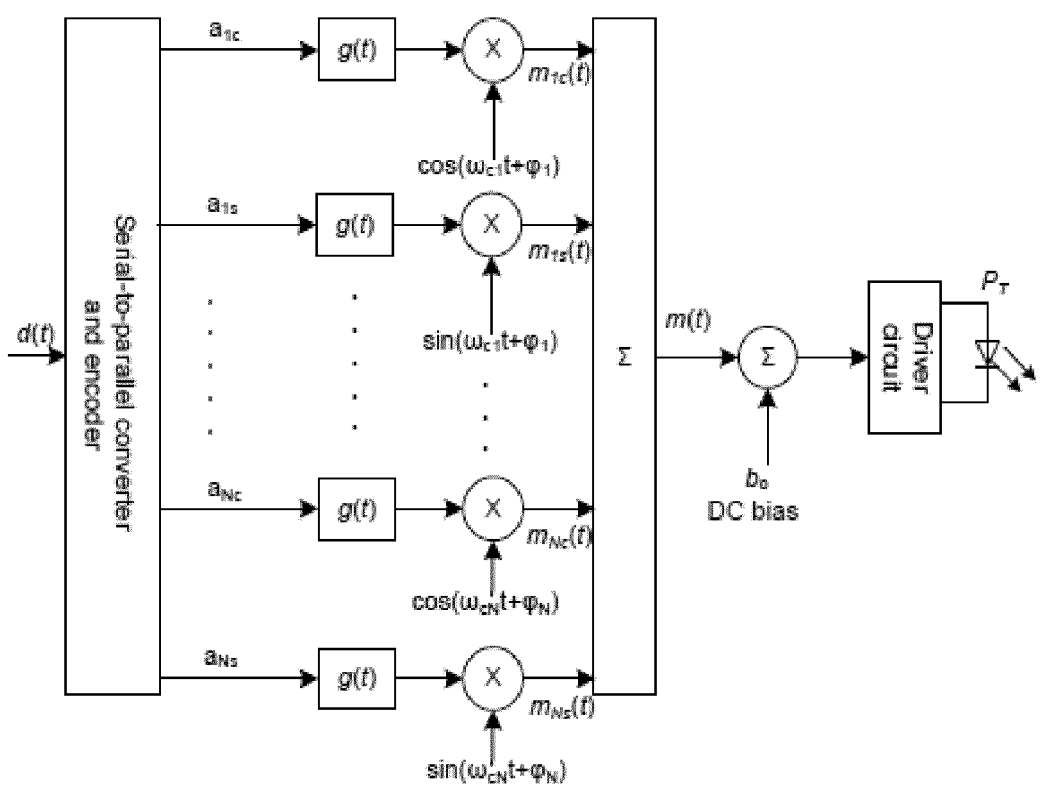
FIG. 11 is a block diagram of a serial-to-parallel converter with data encoding according to an embodiment of the invention.

FIG. 11 shows a serial-to-parallel converter with data encoding embodying aspects of the invention. An additional level of security may be used by taking the input data (serial) stream and converting it bit-by-bit, byte-by-byte, or other data frame lengths into parallel data. In the case of a bit-by-bit decomposition of the serial data stream, as exemplified in FIG. 11, each bit is converted to its own (radian) frequency $\omega_{nc}$. The series of frequencies are then combined into a single data stream as a combination of multiple frequency signals. This signal is then applied to the optical source, as shown in FIG. 7, with the output light coupled into the POF. This situation leads to numerous encryption possibilities, such as with the frequencies of each bit in the data frame being pseudo-randomized following, for example, a Fibonacci-based PN code, or with the frequencies of the data bits being non-sequential (shuffled). Multiple information streams may also be thought of as serial-to-parallel conversion followed by a combination of the data streams back into a "serial stream" in a frequency sense (not necessarily temporal bit sequence sense).

Figure 12:
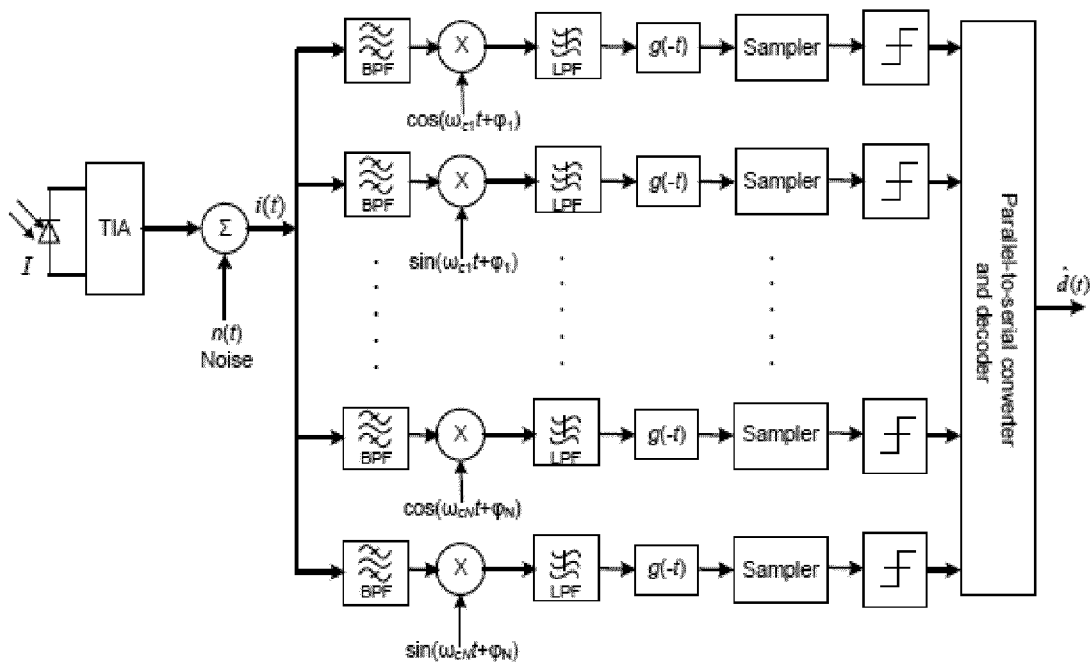
FIG. 12 is a block diagram of a parallel-to-serial converter with decoding according to an embodiment of the invention.

FIG. 12 shows a parallel-to-serial converter with decoding embodying aspects of the invention. The situation is reversed at the receiver where the frequency-varying optical data stream is emitted from the POF and photodetected. The reverse steps of the frequency serial-to-parallel "encryption" steps are then undertaken with the associated parallel-to-serial converter at the receiver end of the system. An exemplary parallel-to-serial converter for use with embodiments of the present invention is shown in FIG. 12.

The optical signal, $P_T$, is coupled into the POF and transmitted. At the receiving location, the optical signal is converted back to an electrical signal with the parallel-to-serial conversion process executed in an embodiment as shown in FIG. 12. The resultant data stream is shown on the right hand side of FIG. 12.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An optical communication system comprising:
   an optical communication fiber; and
   a plurality of modules, each of said modules comprising an optical transceiver, said optical transceiver being optically coupled to the optical communication fiber by a corresponding drop and configured for transmitting and/or receiving one or more optical signals via the optical communication fiber, said optical signals comprising frequency encoded data and representing a plurality of individual data streams formatted according to a plurality of different communication protocols, wherein the optical signals are frequency encoded by converting serial input data of the optical signals into parallel data in a bit-by-bit decomposition, each bit being converted to a particular frequency, the frequencies of the converted bits being shuffled into non-sequential order;
   wherein optical communication is enabled among the modules via the optical communication fiber, and
   wherein optical communication of individual data streams formatted according to a first communication protocol of the plurality of different communication protocols is distinguished from optical communication of individual data streams formatted according to a second communication protocol of the plurality of different communication protocols using intensity modulation of the optical signals.

2. The system of claim 1, wherein the optical communication fiber is a polymer optical fiber.

3. The system of claim 1, wherein the optical communication fiber comprises a section of a glass optical fiber and a section of a polymer optical fiber.

4. The system of claim 1, wherein the individual data streams each have a different wavelength and are multiplexed on the optical communication fiber using wavelength division multiplexing.

5. The system of claim 1, wherein the individual data streams communicate information according to a category of information selected from the group of categories consisting of safety information, security information, control command information, and sensor measurement information.

6. The system of claim 1, wherein the system further comprises a wavelength selective device for permitting propagation on the optical communication fiber of a first optical signal having a first wavelength and for blocking propagation on the optical communication fiber of a second optical signal having a second wavelength different from the first wavelength.

7. The system of claim 6, wherein the first optical signal is associated with a first category of information and the second optical signal is associated with a second category of information.

8. The system of claim 7, wherein the categories of information are selected from the group of categories consisting of safety information, security information, control command information, and sensor measurement information.

9. The system of claim 1, wherein the individual data streams are multiplexed on the optical communication fiber using at least one of the following: wavelength division multiplexing, frequency division multiplexing, and time division multiplexing.

10. The system of claim 1, wherein each of the modules comprises a processor, said processor being configured for executing a control application to control one or more process control devices in an industrial plant.

11. The system of claim 10, wherein the optical signals include a first optical signal having a first wavelength and a second optical signal having a second wavelength different from the first wavelength, and wherein the first optical signal is associated with a higher priority message and the second optical signal is associated with a lower priority message.

12. The system of claim 1, further comprising for each of the modules a cladding on the optical communication fiber opposite the corresponding drop to improve coupling between each of the modules and the optical communication fiber.

13. The system of claim 12, wherein the cladding comprises a reflective material.

14. The system of claim 1, wherein the drop corresponding to each of the modules comprises a separator and one or more optical detectors, said separator being configured to separate light on the optical communication fiber into the optical signals representing the individual data streams and said optical detectors being configured to convert the separated optical signals into electrical signals.

15. The system of claim 14, wherein the drop further comprises one or more emitters, each of said emitters being tuned to emit at a different wavelength.

16. An optical communication system comprising:
a polymer optical fiber;
a first module comprising a first optical transceiver, wherein the first module transmits a first optical signal on the polymer optical fiber, said first optical signal having a first wavelength and formatted according to a first communication protocol; and
a second module comprising a second optical transceiver, wherein the second module transmits a second optical signal on the polymer optical fiber, said second optical signal having a second wavelength and formatted according to a second communication protocol, wherein the second wavelength is different from the first wavelength and the second communication protocol is different from the first communication protocol, and wherein the second optical signal is distinguished from the first optical signal using intensity modulation;
wherein the first and second optical signals are frequency encoded by converting serial input data of the first and second optical signals into parallel data in a bit-by-bit decomposition, each bit being converted to a particular frequency, the frequencies of the converted bits being shuffled into non-sequential order.

17. The system of claim 16, further comprising a third module comprising a third optical transceiver, wherein the third module is coupled to the polymer optical fiber.

18. The system of claim 17, wherein the first module is coupled to the polymer optical fiber by a drop.

19. The system of claim 18, wherein the drop comprises an emitter component that introduces the first optical signal into the polymer optical fiber and wherein reflective material is disposed on the outside of the polymer optical fiber at a position opposed to the drop.

20. The system of claim 18, wherein the drop comprises:
a separator component that separates optical signals propagating on the drop based on wavelength; and
a plurality of detectors, each detector physically aligned to detect an optical signal separated by the separator component.

21. The system of claim 16, further comprising an equipment cabinet, wherein the first module and the second module and the polymer optical fiber are retained within the equipment cabinet.

22. A method of communication comprising:
transmitting a first optical signal on a first polymer optical fiber, wherein the first optical signal has a first wavelength and a first communication protocol format, and wherein the first wavelength is allocated for a first category of communication;
transmitting a second optical signal on the first polymer optical fiber, wherein the second optical signal has a second wavelength different from the first wavelength and a second communication protocol format different from the first communication protocol format, and wherein the second wavelength is allocated for a second category of communication;
separating the first optical signal from the second optical signal based on a difference in wavelength and communication protocol format;
after separating the first optical signal from the second optical signal, receiving the first optical signal;
frequency encrypting the optical signals by converting serial input data of the optical signals into parallel data in a bit-by-bit decomposition;
converting each bit to a particular frequency; and
shuffling the frequencies of the converted bits into non-sequential order.

23. The method of claim 22, further comprising, after separating the first optical signal, receiving the second optical signal.

24. The method of claim 23, wherein the receiving the first optical signal and receiving the second optical signal is based at least in part on differentiating between the first category of communication and the second category of communication.

25. The method of claim 24, further comprising processing the information received from the first optical signal before processing the information received from the second optical signal based on a higher priority associated with the first category of communication relative to a lower priority associated with the second category of communication.

26. The method of claim 22, wherein separating the first optical signal from the second optical signal is performed by a diffraction grating.

27. The method of claim 22, wherein separating the first optical signal from the second optical signal is performed by a prism.

28. The method of claim 22, wherein separating the first optical signal from the second optical signal is performed by a wavelength selective filter and further comprising propagating the first optical signal on a second polymer optical fiber, wherein the second polymer optical fiber is coupled to the first polymer optical fiber by the wavelength selective filter.

29. An optical communication system comprising:
a polymer optical fiber;
a plurality of optical transceivers, each of said optical transceivers being configured for transmitting and/or receiving one or more optical signals via the optical fiber, said optical signals comprising frequency encoded data and representing a plurality of individual data streams each formatted according to a different communication protocol, wherein the different communication protocols are distinguished from each other by intensity modulation of the optical signals, wherein the optical signals are frequency encoded by converting serial input data of the optical signals into parallel data in a bit-by-bit decomposition, each bit being converted to a particular frequency, the frequencies of the converted bits being shuffled into non-sequential order;
a plurality of optical drops for coupling the optical transceivers to the optical fiber, each of said optical drops corresponding to one of the optical transceivers; and
a plurality of processors, each of said processors being configured for executing a control application to control one or more process control devices in an industrial plant and corresponding to one of the optical transceivers;
wherein optical communication is enabled among the process control devices via the optical fiber.

* * * * *